US012072645B2

(12) United States Patent
Kita

(10) Patent No.: US 12,072,645 B2
(45) Date of Patent: Aug. 27, 2024

(54) IMAGE FORMING APPARATUS CONFIGURED TO GENERATE DATA FOR DENSITY CORRECTION

(71) Applicant: CANON KABUSHIKI KAISHA, Tokyo (JP)

(72) Inventor: Hiroshi Kita, Shizuoka (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/845,155

(22) Filed: Jun. 21, 2022

(65) Prior Publication Data

US 2023/0008958 A1 Jan. 12, 2023

(30) Foreign Application Priority Data

Jul. 6, 2021 (JP) ................................ 2021-112326

(51) Int. Cl.
*G03G 15/16* (2006.01)
*G03G 15/00* (2006.01)

(52) U.S. Cl.
CPC ..... *G03G 15/1605* (2013.01); *G03G 15/1675* (2013.01); *G03G 15/5041* (2013.01); *G03G 2215/00059* (2013.01)

(58) Field of Classification Search
CPC ........... G03G 15/1605; G03G 15/1675; G03G 15/5041; G03G 2215/00059
See application file for complete search history.

(56) References Cited

U.S. PATENT DOCUMENTS

| | | | |
|---|---|---|---|
| 7,203,433 | B2 | 4/2007 | Kato et al. |
| 8,139,968 | B2 | 3/2012 | Katoh et al. |
| 9,454,109 | B2 | 9/2016 | Kojima et al. |

FOREIGN PATENT DOCUMENTS

| | | | | |
|---|---|---|---|---|
| JP | 2005-017621 | A | | 1/2005 |
| JP | 2009-003178 | A | | 1/2009 |
| JP | 2009-025814 | A | | 2/2009 |
| JP | 2014081553 | A | * | 5/2014 |
| JP | 2016-057582 | A | | 4/2016 |

OTHER PUBLICATIONS

Translation of JP-2014081553-A (Year: 2014).*

* cited by examiner

*Primary Examiner* — Arlene Heredia
(74) *Attorney, Agent, or Firm* — Venable LLP

(57) ABSTRACT

An image forming apparatus includes an image forming unit configured to form an image on an intermediate transfer member; a transfer member configured to output a transfer voltage in order to cause a transfer current to flow so as to transfer the image to a sheet; a measurement unit configured to measure a density of the image; and a control unit configured to control the image forming unit to form a test image on the intermediate transfer member based on test image data, control the measurement unit to acquire a measured density of the test image, correct the measured density based on an evaluation value of an electric resistance of a path through which the transfer current flows, and generate data for density correction based on the test image data and a corrected measured density.

16 Claims, 9 Drawing Sheets

IMAGE FORMING APPARATUS CONFIGURED TO GENERATE DATA FOR DENSITY CORRECTION

BACKGROUND OF THE INVENTION

Field of the Invention

The present disclosure relates to a density correction technique for an image forming apparatus.

Description of the Related Art

An electrographic image forming apparatus (simply referred to in the following as an image forming apparatus) including an intermediate transfer member primarily transfers, to the intermediate transfer member, an image formed on a photoconductor using toner (developer), and then secondarily transfers the image to a sheet to form the image on the sheet. Here, primary transfer is performed by a primary transfer member outputting a primary transfer voltage to cause a primary transfer current to flow. Similarly, secondary transfer is performed by a secondary transfer member by outputting a secondary transfer voltage to cause a secondary transfer current to flow.

The image forming apparatus performs various adjustment control including a density correction control in order to maintain the quality of the image being formed on the sheet. During the density correction control, the image forming apparatus forms a test image on the intermediate transfer member, for example, and measures the density of the test image with a sensor. The image forming apparatus then generates, based on the measured density of the test image, image forming conditions such as a gradation correction table, for example, for rendering the density of the image to be formed to match a target density. However, the density of the image to be formed on the sheet may vary due to the secondary transfer from the intermediate transfer member to the sheet. For example, the secondary transfer current flows through a path including the secondary transfer member and the intermediate transfer member, whereas the conductivity of the path may vary depending on the usage status or the like of the image forming apparatus. Variation of the conductivity of the path through which the secondary transfer current flows may cause the density of the image being transferred to the sheet by secondary transfer to change from the density in the intermediate transfer member. Therefore, the density of the image being formed on the sheet may deviate from the target value, even when performing the density correction control that causes the density of the test image of the intermediate transfer member to approach the target value.

Japanese Patent Laid-Open No. 2005-17621 discloses a configuration that forms a test image on an intermediate transfer member, further transfers the test image to a secondary transfer member, and detects the density of the test image transferred to the secondary transfer member.

Measuring the density of the test image after secondary transfer as with the configuration described in the Japanese Patent Laid-Open No. 2005-17621 allows for performing the density correction control while taking into account the effect of secondary transfer, whereby the density of the image being formed on the sheet can approach the target density. However, the foregoing method requires a mechanism for cleaning the test image transferred to the secondary transfer member.

SUMMARY OF THE INVENTION

According to an present disclosure, an image forming apparatus includes: an image forming unit configured to form an image on an intermediate transfer member based on image data; a transfer member configured to output a transfer voltage, in order to cause a transfer current to flow so as to transfer the image formed on the intermediate transfer member to a sheet; a first measurement unit configured to measure a density of the image formed on the intermediate transfer member; and a control unit configured to: control the image forming unit to form a test image on the intermediate transfer member based on test image data; control the first measurement unit to acquire a measured density of the test image; correct the measured density of the test image based on an evaluation value of an electric resistance of a path through which the transfer current flows; and generate data for density correction, based on the test image data and a corrected measured density of the test image.

Further features of the present invention will become apparent from the following description of exemplary embodiments with reference to the attached drawings.

DESCRIPTION OF THE EMBODIMENTS

Figure 1:
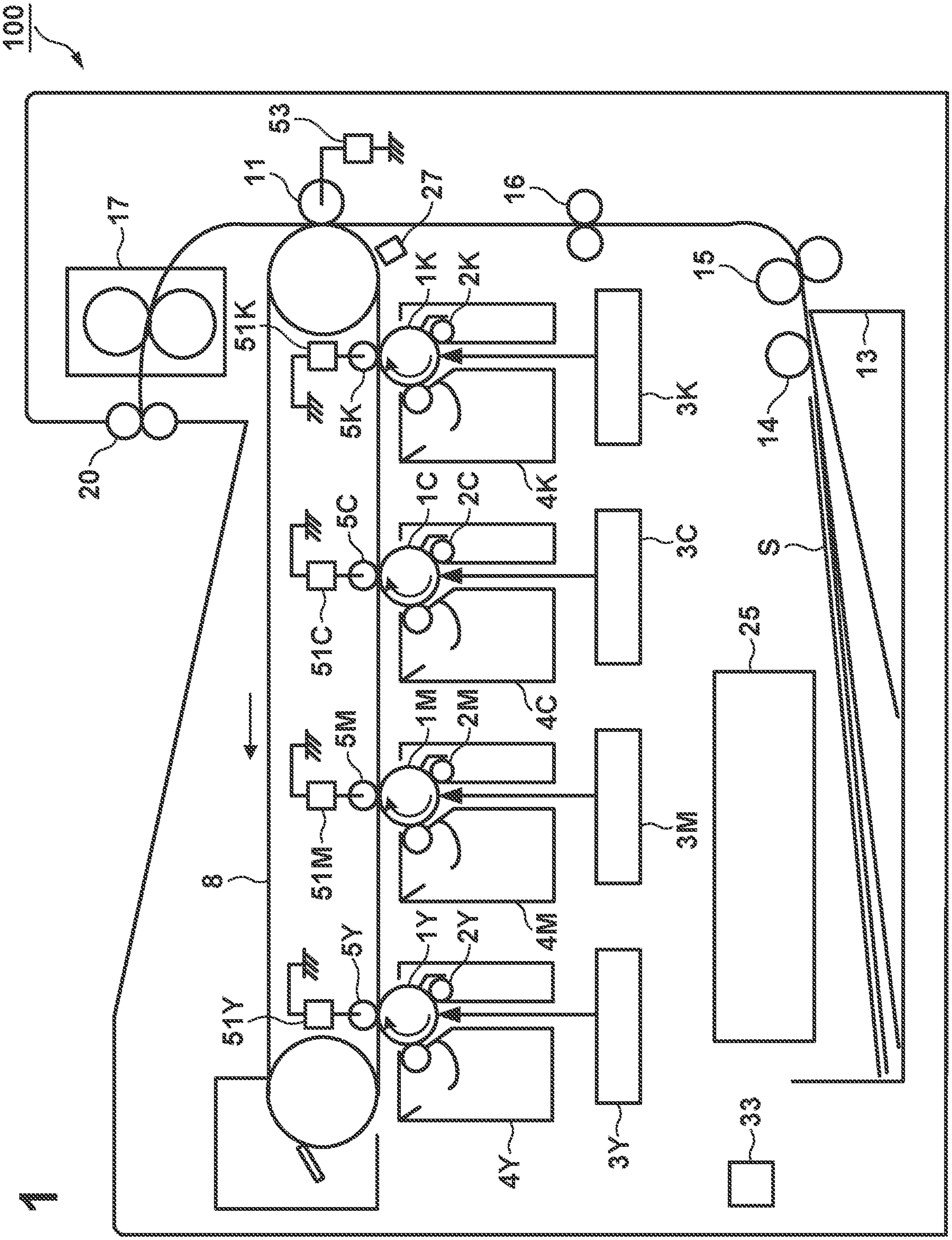
FIG. 1 is a configuration diagram of an image forming apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment

FIG. 1 is a schematic configuration diagram of an image forming apparatus 100 according to the present embodiment. The image forming apparatus 100 includes four image forming units respectively corresponding to the colors yellow, magenta, cyan and black. Here, in FIG. 1, characters "Y", "M", "C" and "K" are provided at the end of respective reference numerals for members forming the image forming units corresponding to the colors yellow, magenta, cyan and black. Each image forming unit forms a toner image of a corresponding color and transfers the formed image to an intermediate transfer belt 8. The configuration and operation of each image forming unit are similar, and therefore only the configuration and operation of the image forming unit for yellow will be described below. A photoconductor 1Y is rotationally driven in a clockwise direction in the figure during image forming. A charging roller 2Y outputs a charging voltage to charge the surface of the photoconductor 1Y to a uniform potential. An exposing apparatus 3Y exposes the photoconductor 1Y to form an electrostatic latent image on the photoconductor 1Y. A developing apparatus 4Y outputs a developing voltage to cause yellow toner to adhere to the electrostatic latent image on the photoconductor 1Y, thereby forming a toner image on the photoconductor 1Y. A primary transfer roller 5Y outputs a primary transfer voltage so as to primarily transfer the toner image on the photoconductor 1Y to the intermediate transfer belt 8. A primary transfer power source 51Y supplies the primary transfer voltage to the primary transfer roller 5Y. Transferring each color toner on the intermediate transfer belt 8 in an overlapping manner allows for reproducing a color which is different from yellow, magenta, cyan and black.

The intermediate transfer belt 8 is rotationally driven in a counterclockwise direction in the figure during image forming. As a result, the toner image transferred to the intermediate transfer belt 8 is conveyed to a position facing a secondary transfer roller 11. On the other hand, a sheet S stored in a cassette 13 is conveyed to a position facing the secondary transfer roller 11 by rollers 14, 15 and 16 provided along the conveyance path. The secondary transfer roller 11 outputs a secondary transfer voltage so as to secondarily transfer the toner image on the intermediate transfer belt 8 to the sheet S. The secondary transfer power source 53 supplies the secondary transfer voltage to the secondary transfer roller 11. The sheet S having the toner image transferred thereon is conveyed to a fixing apparatus 17. The fixing apparatus 17 applies heat and pressure to the sheet S so as to fix the toner image on the sheet S. A discharge roller 20 discharges the sheet S having the toner image fixed thereon to the outside of the image forming apparatus 100.

Figure 2:
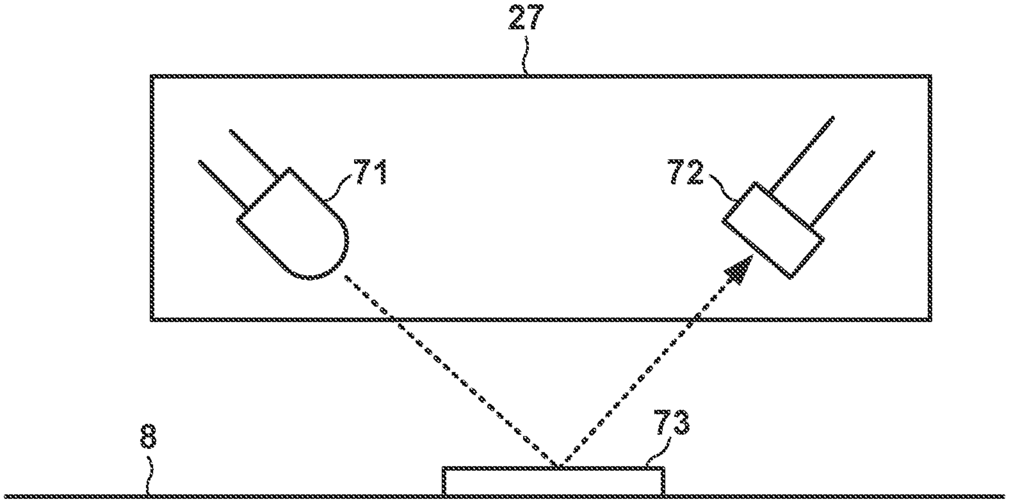
FIG. 2 is a configuration diagram of a density sensor according to an embodiment.

A control unit 25 controls the image forming apparatus 100 as a whole. An environment sensor 33, which is a temperature sensor, a humidity sensor or a temperature and humidity sensor, measures one or both of temperature and humidity inside or outside the image forming apparatus 100. The environment sensor 33 outputs the temperature and/or humidity, which is a measurement result, to the control unit 25. A density sensor 27 measures density of a toner image formed on the intermediate transfer belt 8. FIG. 2 is a configuration diagram of the density sensor 27. A light-emitting element 71 emits light toward the intermediate transfer belt 8. A light receiving element 72 is arranged so as to receive the regular reflected light from the intermediate transfer belt 8 or the toner image (test image) 73 for density detection formed on the intermediate transfer belt 8. The light receiving element 72 outputs information indicating an amount of received light to the control unit 25. The higher the density of the test image, the lower the amount of regular reflected light becomes, which allows the control unit 25 to determine the density of the test image 73 based on the amount of light received by the light receiving element 72.

The volume resistivity of the intermediate transfer belt 8 is determined in terms of transferability. For example, an excessively low volume resistivity may generate transfer failure due to leakage of transfer current in a high-temperature and high-humidity environment. In addition, an excessively high volume resistivity may generate transfer failure due to abnormal discharge in a low-temperature and low-humidity environment. As an example, the volume resistivity of the intermediate transfer belt 8 may be set in a range within $1\times10^9$ to $10^{11}$ Ω·cm. Furthermore, as an example, the intermediate transfer belt 8 may be a 70 μm thick endless belt formed of polyimide resin with a volume resistivity adjusted to $1\times10^{10}$ Ω·cm. Here, the volume resistivity can be adjusted by mixing carbon as a conducting-agent. The resin material of the intermediate transfer belt 8 is not limited to polyimide resin, and thermoplastic resin such as thermoplastic resin polyester, polycarbonate, polyarylate, acrylonitrile-butadiene-styrene copolymer (ABS), polyphenylene sulfide (PPS), polyvinylidene fluoride (PVdF), polyethylene naphthalate (PEN), or mixed resin thereof may be used as the resin material. In addition, the conducting-agent is not limited to carbon, and conductive metal oxide may be used as the conducting-agent. Furthermore, an ion conductive conducting-agent may also be used.

The secondary transfer roller 11 is formed by covering a mandrel (core material) with an elastic layer. A nickel-plated steel bar, for example, may be used for the mandrel. For the elastic layer, a foamed sponge body including an ethylene-propylene-diene copolymer (EPDM) as a main ingredient, for example, may be used, with the volume resistivity adjusted to around $1\times10^8$ Ω·cm. It is also possible to use styrene-butadiene rubber (SBR), isoprene rubber (IR), or the like, for the elastic layer. The elastic layer of the present embodiment includes carbon, which is an electronically conductive conducting-agent. In other words, the conduction configuration of the secondary transfer roller 11 of the present embodiment is electronically conductive configuration. The secondary transfer roller 11 rotates along with rotation of the intermediate transfer belt 8. Values of the primary transfer voltage and the secondary transfer voltage are determined according to the material of the intermediate transfer belt 8, the material of the primary transfer rollers 5Y, 5M, 5C and 5K, the material of the secondary transfer roller 11, the configuration of the image forming apparatus 100, or the like.

Figure 3:
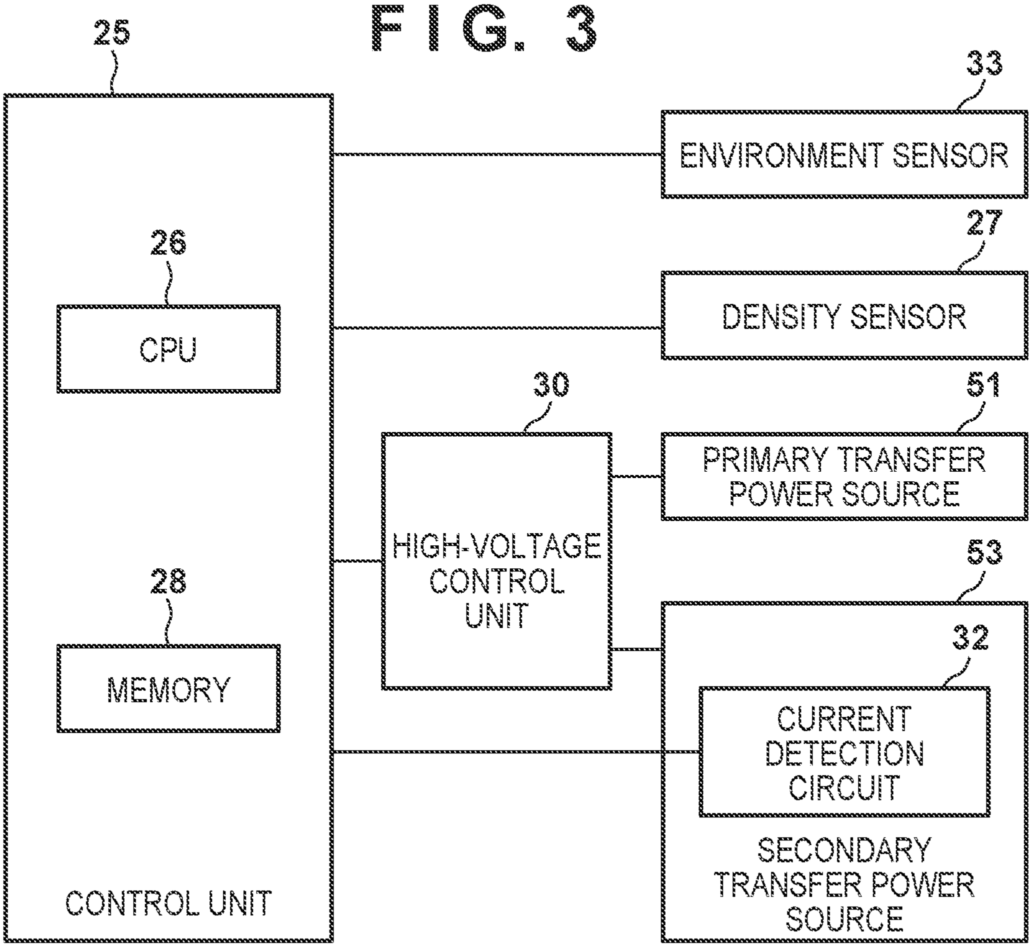
FIG. 3 is a control configuration diagram of an image forming apparatus according to an embodiment.

FIG. 3 is a control configuration diagram of the image forming apparatus 100. A CPU 26 of the control unit 25 executes a program stored in the memory 28 to control the image forming apparatus 100 as a whole. Here, the memory 28 in FIG. 3 collectively refers to a volatile memory (e.g., RAM) and a non-volatile memory (e.g., flash memory). The control unit 25 acquires, from the density sensor 27, information indicating the amount of received light, and determines, based on the information, the density of the test image formed on the intermediate transfer belt 8. In addition, the control unit 25 controls a high-voltage control unit 30 so as to control the primary transfer voltage output from the primary transfer power sources 51Y, 51M, 51C and 51K (collectively referred to as the primary transfer power source 51 in FIG. 3) and the secondary transfer voltage output from the secondary transfer power source 53. Here, the secondary transfer power source 53 of the present embodiment includes a current detection circuit 32 configured to measure the current value of the secondary transfer current which is caused to flow from the secondary transfer power source 53 to the intermediate transfer belt 8 via the secondary transfer roller 11, by the secondary transfer power source 53 outputting the secondary transfer voltage. The current detection circuit 32 notifies the control unit 25 of the current value of the secondary transfer current. In addition, the control unit 25 acquires information indicating temperature and/or humidity from the environment sensor 33 as environment information.

Next, a method for determining the secondary transfer voltage will be described. First, the current value of the secondary transfer current for performing optimal secondary transfer varies depending on temperature and humidity. Therefore, the relation between the environment information (temperature and/or humidity) and the current value (target value) of an appropriate secondary transfer current is preliminarily determined and stored in the memory 28 as target current value information. The control unit 25 acquires the environment information from the environment sensor 33 in a pre-rotation process before starting image forming, for example, and, referring to the target current value information, determines a target value of the secondary transfer current corresponding to the acquired environment information. The control unit 25, while measuring the current value of the secondary transfer current by the current detection circuit 32, controls the secondary transfer voltage output by the secondary transfer power source 53 so that the current value being measured (measured value) matches the target value. The control unit 25 stores the voltage value of the secondary transfer voltage, when the measured value matches the target value, in the memory 28 as a set voltage value. Here, the pre-rotation process, which is a preparation process for image forming, corresponds to a period from receiving image data from an external apparatus until starting image forming. In the image forming process following the pre-rotation process, the control unit 25 controls the secondary transfer power source 53 so that a secondary transfer voltage at the set voltage value stored in the memory 28 is output.

Next, a density correction control executed by the image forming apparatus 100 will be described. First, the density correction control will be described as a comparative example, referring to FIG. 4. Note that, although the density correction control of the color yellow is described in the following, the same goes for other colors. Upon starting the density correction control, the control unit 25 forms a test image for the color yellow on the intermediate transfer belt 8 based on test image data for the color yellow. The test image includes a plurality of patch images of different densities. Pixel values in a single patch image indicated by the test image data are the same, and the pixel values are indicated as the ratio (%) relative to the maximum pixel value (pixel value having the maximum density) in the horizontal axis of FIG. 4. In the present example, according to pixel values 12.5%, 25%, 37.5%, 50%, 62.5%, 75%, 87.5% and 100%, a test image including eight patch images is formed. The control unit 25 measures the density of each patch image, based on the amount of reflected light in each patch image acquired from the density sensor 27. In the following, the density is referred to as the measured density.

Figure 4:
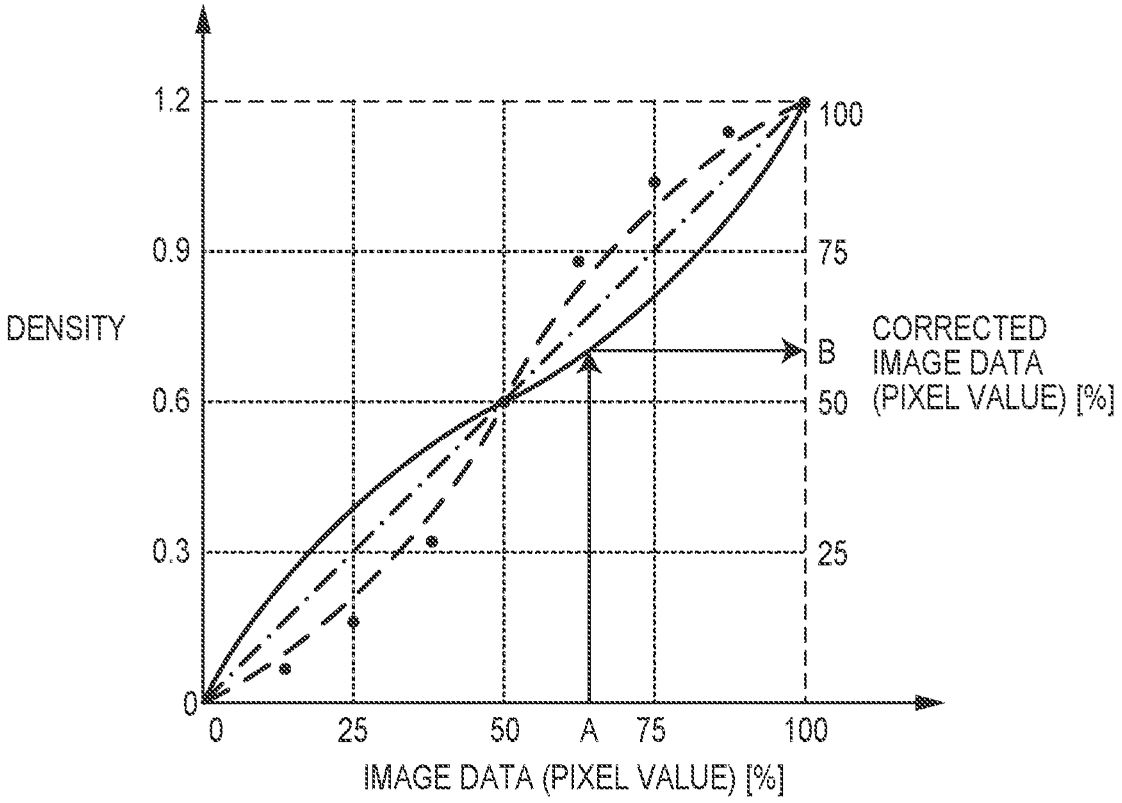
FIG. 4 is an explanatory diagram (graph) of gradation correction according to an embodiment.

The black circles in FIG. 4 indicate a relation between the pixel values of the patch image and the measured densities. The control unit 25 determines the relation between the pixel values and the densities of the image formed on the intermediate transfer belt 8, based on the relation between the pixel values of the patch images and the measured densities. The dashed line in FIG. 4 indicates the determined relation. Here, the relation between the pixel values and the densities of the image formed on the intermediate transfer belt 8 can be determined by spline interpolation of a curved line passing through the origin and the black circles in FIG. 4.

In addition, the long-dashed, short-dashed line in FIG. 4 indicates a relation between the pixel values and the target density of the image formed by the pixel values. Furthermore, the solid line in FIG. 4 indicates the density correction characteristics acquired based on the relation (dashed line) between the pixel values and the densities of the image formed on the intermediate transfer belt 8, and the relation (long-dashed, short-dashed line) between the pixel values and the target density. The density correction characteristics are calculated by determining a symmetry point of the characteristics indicated by the dashed line relative to the characteristics indicated by the long-dashed, short-dashed line. The density correction characteristics generated by the density correction control are stored in the memory 28 as a gradation correction table (data for correcting gradation). During image forming, the control unit 25 converts, based on the density correction characteristics, respective pixel values indicated by the input image data, and forms an image with the converted pixel values. For example, assuming that a pixel value of a certain pixel in the input image data is "A" as illustrated in FIG. 4, the control unit 25 converts the pixel value of the pixel into "B", based on the gradation correction table. In the aforementioned manner, converting pixel values based on the gradation correction table allows the density of the image formed on the intermediate transfer belt to approach the target density.

Figure 5:
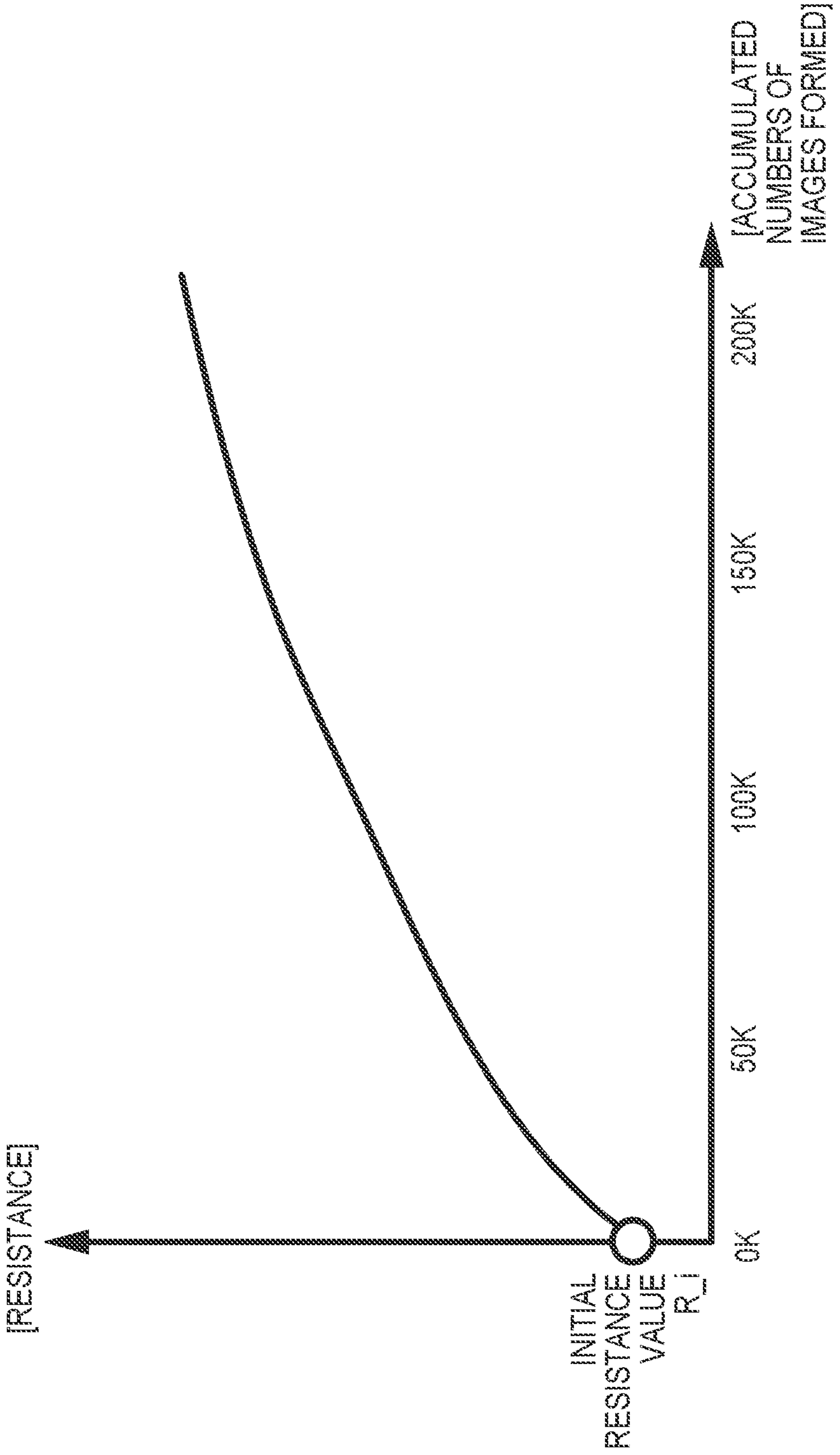
FIG. 5 illustrates a relation between accumulated numbers of images formed and resistance values of a secondary transfer resistance according to an embodiment.

Next, there will be described an effect on secondary transfer due to variation of the electric resistance (conductivity) of the path through which the secondary transfer current flows. In the following description, the electric resistance of the path through which the secondary transfer current flows is referred to as a secondary transfer resistance. FIG. 5 illustrates an exemplary relation between the resistance value of the secondary transfer resistance and the accumulated number of sheets S on which image forming is performed. As illustrated in FIG. 5, the resistance value of the secondary transfer resistance increases as the accumulated number of sheets on which image forming is performed increases, with the minimum value being the initial resistance value $R_i$ when the accumulated number of sheets on which image forming is performed is 0.

Figure 6:
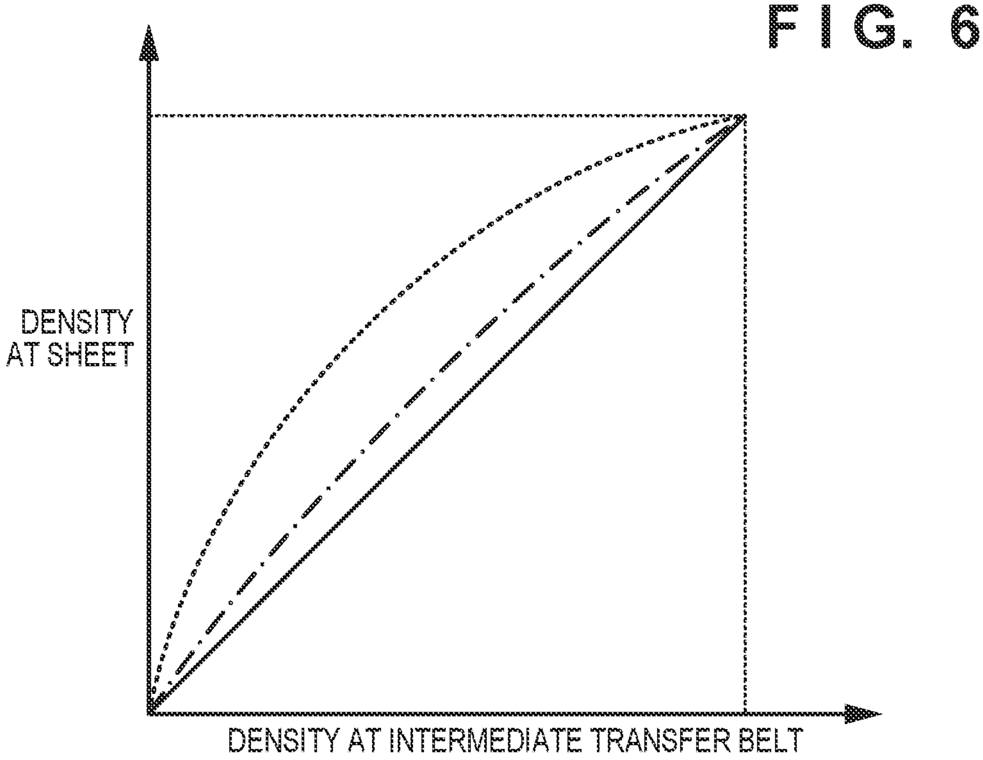
FIG. 6 illustrates a relation between the image density on an intermediate transfer belt and the image density on a sheet.

FIG. 6 illustrates a relation between the density of a toner image on the intermediate transfer belt 8 and the density of the toner image on the sheet S when the toner image is transferred to the sheet S. The density of the toner image formed on the intermediate transfer belt 8 is the density detected by the density sensor 27. In addition, the density of the toner image formed on the intermediate transfer belt 8 by the density correction control described above can be regarded as the target density of the pixel value indicated by the image data. Therefore, the horizontal axis of FIG. 6 can be interpreted as pixel values. The solid line in FIG. 6 indicates an ideal relation, i.e., a relation such that the density of the toner image formed on the intermediate transfer belt 8 and the density of the toner image on the sheet S are equal. In addition, the long-dashed, short-dashed line and the dotted line in FIG. 6 indicate a relation in a case where the secondary transfer resistance has increased from the initial resistance value R_i. Here, the relation indicated by the dotted line indicates a case where the increase of the secondary transfer resistance is larger than that in the relation indicated by the long-dashed, short-dashed line. As illustrated in FIG. 6, the more the secondary transfer resistance increases, the higher the density of the toner image on the sheet S becomes, relative to the density on the intermediate transfer belt 8. In the following, there will be explained the reason why a higher resistance value of the secondary transfer resistance, in other words, a lower conductivity of the path, causes a higher density on the sheet S than the density on the intermediate transfer belt 8 before the transfer to the sheet S.

First, as has been described above, the control unit 25 sets the secondary transfer voltage to be output from the secondary transfer power source 53 so that the current value of the secondary transfer current matches the target value. Therefore, decrease of the conductivity caused by increase of the secondary transfer resistance due to using the image forming apparatus 100 causes the secondary transfer voltage to increase. Increase of the secondary transfer voltage also strengthens the electric field between the secondary transfer roller 11 and the intermediate transfer belt 8. When the electric field between the secondary transfer roller 11 and the intermediate transfer belt 8 becomes stronger, toner on the intermediate transfer belt 8 adheres to the sheet S due to so-called scattering, and a dot gain on the sheet S increases and therefore a density on the sheet S increases. It is therefore possible that the density of the image formed on the sheet S may deviate from the target density, even when the density correction control is performed so that the density of the test image in the intermediate transfer belt 8 approaches the target density. For example, as illustrated in FIG. 5, in a case where the secondary transfer resistance increases (the conductivity decreases) along with usage of the image forming apparatus 100, the density of the image formed on the sheet S becomes higher than the target density.

The present embodiment therefore uses an evaluation value for evaluating the resistance value of the secondary transfer resistance when generating the gradation correction table in the density correction control. In the following, the evaluation value is assumed to be an accumulated value of the time during which the secondary transfer power source 53 has been outputting the secondary transfer voltage (referred to in the following as accumulated power supply time). Accordingly, the control unit 25 manages the accumulated power supply time by counting the period in which the secondary transfer power source 53 has been outputting the secondary transfer voltage. The current accumulated power supply time is stored in the memory 28. Note that, in the present embodiment, a higher accumulated power supply time indicates that a larger amount of the secondary transfer resistance has increased relative to the initial resistance value R_i.

Figure 7:
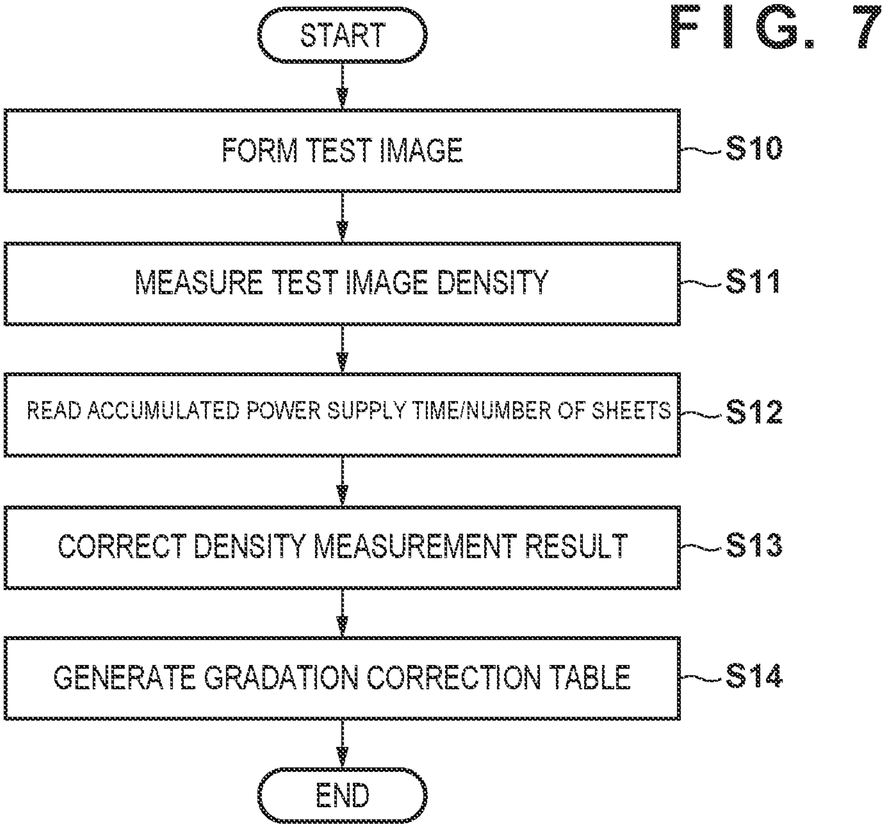
FIG. 7 is a flowchart of a density correction control according to an embodiment.

FIG. 7 is a flowchart of the density correction control according to the present embodiment. At S10, the control unit 25 forms a test image on the intermediate transfer belt 8 for density measurement. The test image includes a plurality of patch images of different densities. At S11, the control unit 25 measures the density of each patch image of the test image using the density sensor 27. At S12, the control unit 25 reads the current accumulated power supply time from the memory 28. At S13, the control unit 25 corrects the measured density measured at S11 for each patch image, based on the current accumulated power supply time. At S14, the control unit 25 generates a gradation correction table based on the corrected measured density of each patch image and stores the generated table in the memory 28. Here, the method for generating the gradation correction table based on the corrected measured density is similar except that the black circles in FIG. 4 are the measured density after correction of each patch image from the measured density of each patch image.

Figure 8A:
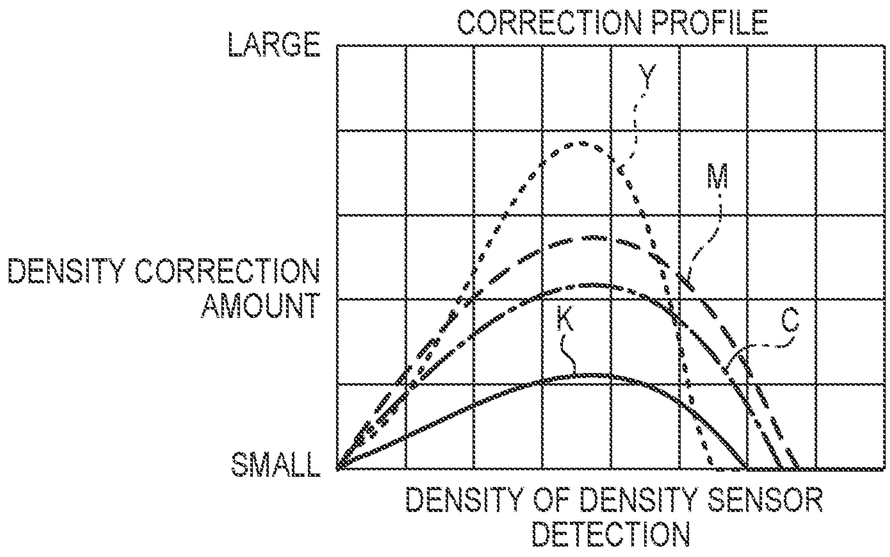
FIG. 8A illustrates first correction information according to an embodiment.
Figure 8B:
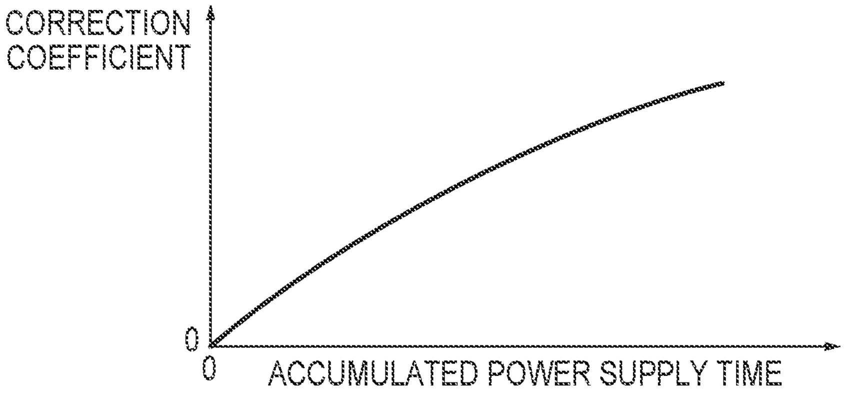
FIG. 8B illustrates second correction information according to an embodiment.

Subsequently, there will be described a method for correcting the measured density at S13. The present embodiment uses two pieces of correction information, namely the first correction information and the second correction information, in order to correct the measured density. FIGS. 8A and 8B illustrate the first correction information and the second correction information, respectively. In the following, the first correction information is referred to as correction profile, and the second correction information is referred to as correction coefficient information. The correction profile is information indicating a correspondence relation between the measured density and a reference correction amount. Here, the reference correction amount is the correction amount of the measured density when a correction coefficient described below is 1. Since the amount of variation of density after the secondary transfer due to the effect of scattering differs for each color, a correction profile is provided for each of the colors used for image forming, namely, yellow (Y), magenta (M), cyan (C) and black (K). As illustrated in FIG. 6, as the density on the intermediate transfer belt 8 varies from the minimum toward the maximum, that is, as the pixel value indicated by the image data varies from the minimum value toward the maximum value, the amount of variation of the density on the sheet S after the secondary transfer has characteristics exhibiting a decrease after an increase. Therefore, the correction profile has similar characteristics, as illustrated in FIG. 8A.

The correction coefficient information is information indicating a correspondence relation between the accumulated power supply time and the correction coefficient. As has been described referring to FIG. 6, a larger resistance value of the secondary transfer resistance causes a larger amount of increase of the density due to the secondary transfer, whereby the correction coefficient grows larger as the accumulated power supply time grows larger. The control unit 25 determines, from the correction coefficient information, a correction coefficient corresponding to the accumulated power supply time which is read at S12. In addition, the control unit 25 determines the reference correction amount of the measured density of a patch image of a certain color from the correction profile of that color. The control unit 25 then calculates a correction amount of the measured density of the patch image by multiplying the determined reference correction amount by the determined correction coefficient, and corrects the measured density. As is obvious from FIGS. 8A and 8B, the measured density is corrected to be higher when the correction coefficient is not 0, and the measured density is higher density due to the secondary transfer. Therefore, forming an image using the gradation correction table generated based on the corrected measured density causes the density of the image formed on the intermediate transfer belt 8 to be equal to or lower than the target density. Here, the amount of decrease, from the target density, of the density of the image formed on the intermediate transfer belt 8 corresponds to the amount of increase of the density due to the secondary transfer. Therefore, the density of the image formed on the sheet S after the secondary transfer approaches the target density corresponding to the pixel value. As such, estimating, based on the evaluation value of the secondary resistance, the amount of increase of the density due to the secondary transfer allows for generating a gradation correction table while taking into account the effect of the secondary transfer, without transferring the test image to a secondary transfer member such as the secondary transfer roller 11.

Figure 9:
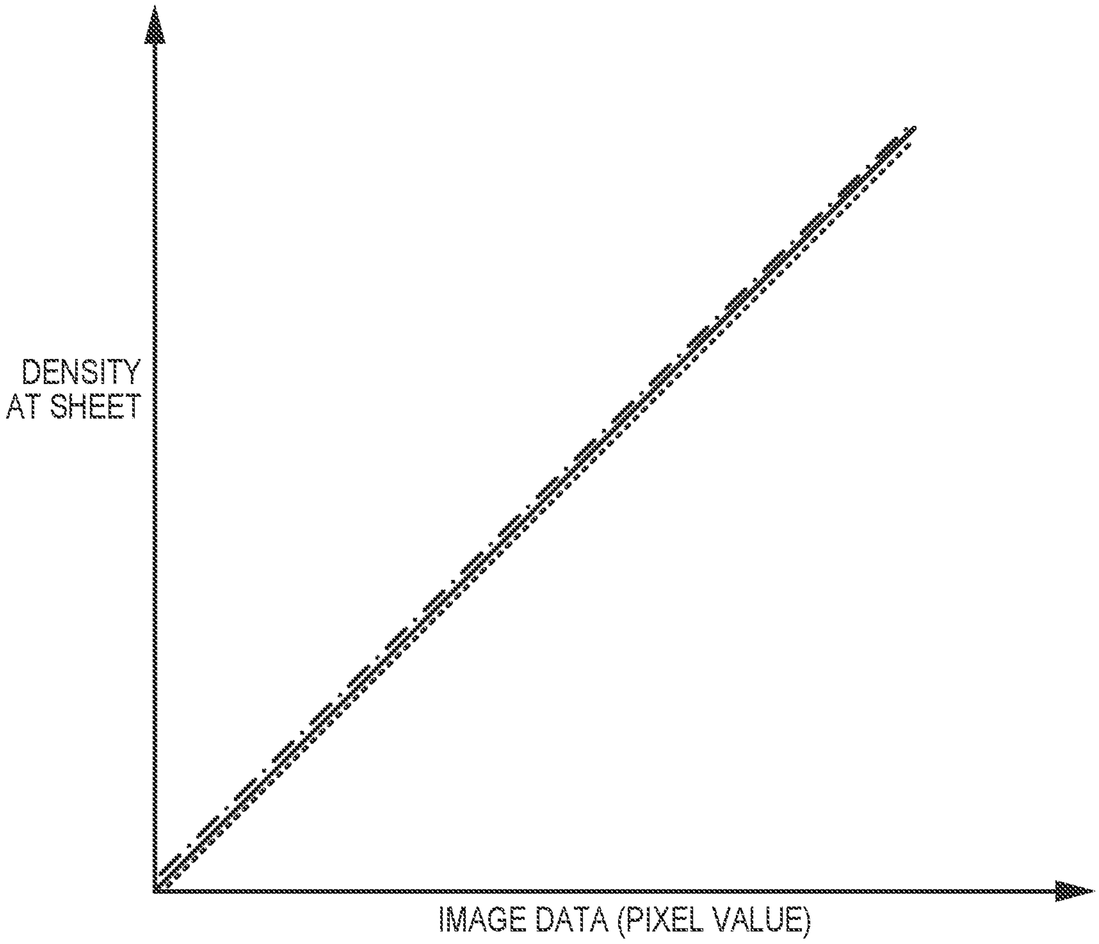
FIG. 9 illustrates a relation between pixel values indicated by image data and image densities on a sheet, in a case of using a gradation correction table generated by a density correction control according to an embodiment.

FIG. 9 illustrates a relation between the pixel values indicated by the image data and the densities of the image formed on the sheet S in a case where image forming is performed using the gradation correction table generated by the density correction control described in FIGS. 8A and 8B. Here, respective lines in the graph of FIG. 9 are similar to those of FIG. 6. As illustrated in FIG. 9, using the gradation correction table generated based on the corrected measured density based on the evaluation value of the secondary resistance allows for rendering the density of the image formed on the sheet S to correspond to the pixel value indicated by the image data.

Note that, although the present embodiment has used the accumulated power supply time as an evaluation value of the secondary transfer resistance, the accumulated number of sheets S on which image forming is performed may also be used as an evaluation value, as illustrated in FIG. 5.

Second Embodiment

Figure 10:
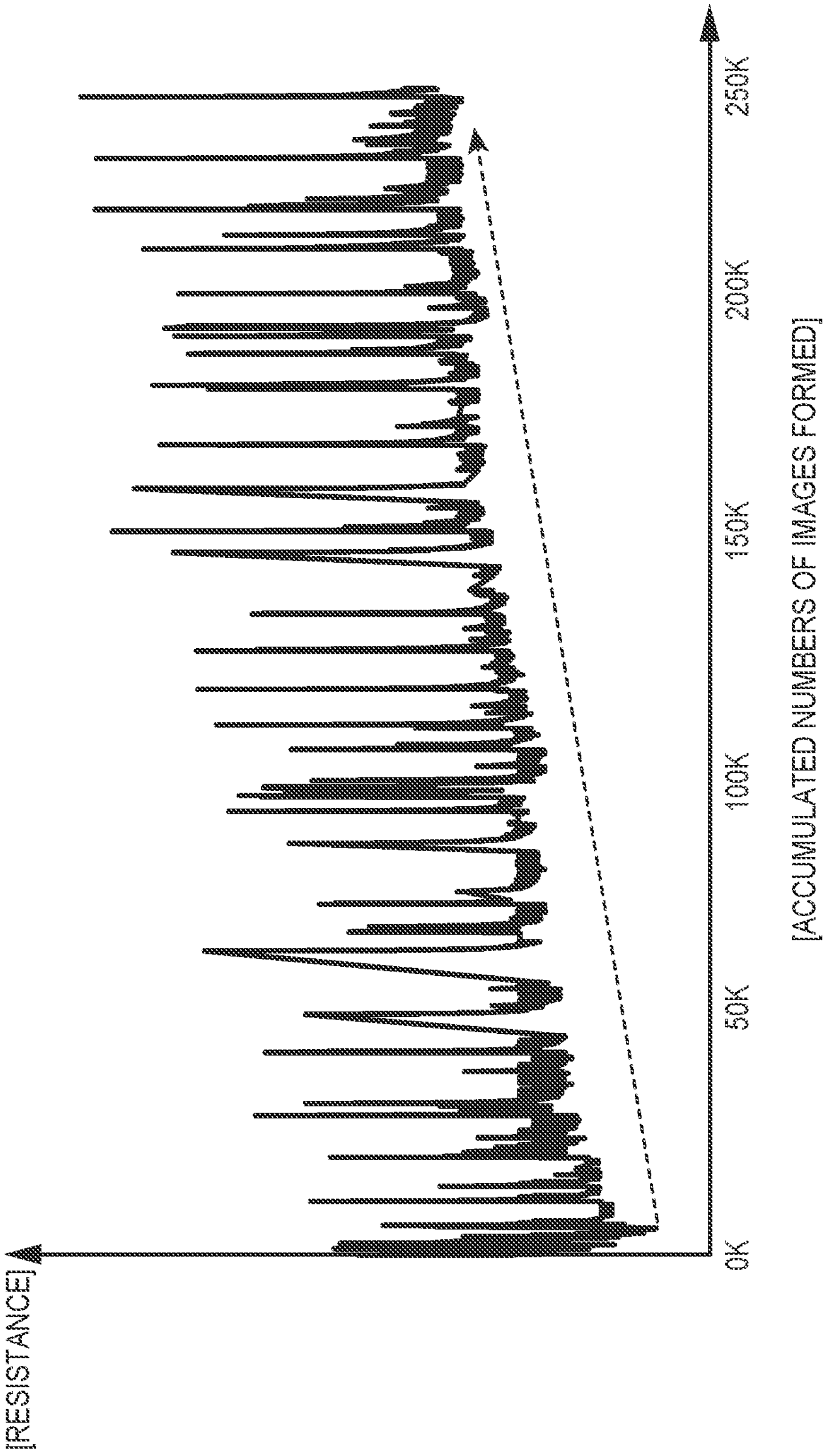
FIG. 10 illustrates a relation between accumulated numbers of images formed and resistance values of the secondary transfer resistance according to an embodiment.

Next, a second embodiment will be explained mainly on differences from the first embodiment. The conduction configuration of the secondary transfer roller 11 according to the first embodiment is electronically conductive configuration. In such a case, the secondary transfer resistance monotonically increases in accordance with the use of the image forming apparatus 100, as has been described referring to FIG. 5. The first embodiment therefore has used, as the evaluation value for the secondary transfer resistance, a value that exhibits a correlation with the secondary transfer resistance and increases monotonically along with the use, such as the accumulated power supply time or the accumulated number of sheets S on which image forming is performed. However, the secondary transfer roller 11 may also employ conduction configuration of ion conductive configuration. For example, when a foamed sponge body including an acrylonitrile butadiene rubber (NBR) as a main ingredient is used as the elastic layer, the conduction configuration of the secondary transfer roller 11 is ion conductive configuration. In addition, the conduction configuration of the secondary transfer roller 11 is also ion conductive configuration when polar rubber such as epichlorohydrin rubber is used as the elastic layer. Using the secondary transfer roller 11 having conduction configuration being ion conductive configuration causes the secondary transfer resistance to generally increase while largely increasing and decreasing iteratively along with the use of the image forming apparatus 100, as illustrated in FIG. 10.

Therefore, in a case where the secondary transfer resistance increases and decreases in accordance with the use of the image forming apparatus 100, the monotonically increasing accumulated power supply time or the like cannot evaluate the secondary transfer resistance with a high precision, which may lead to a degraded precision of the gradation correction table generated by the density correction control. The present embodiment generates a gradation correction table which is highly precise also in a case where the secondary transfer resistance does not monotonically increase in accordance with the use of the image forming apparatus 100, thereby improving the quality of the image to be formed.

Figure 11:
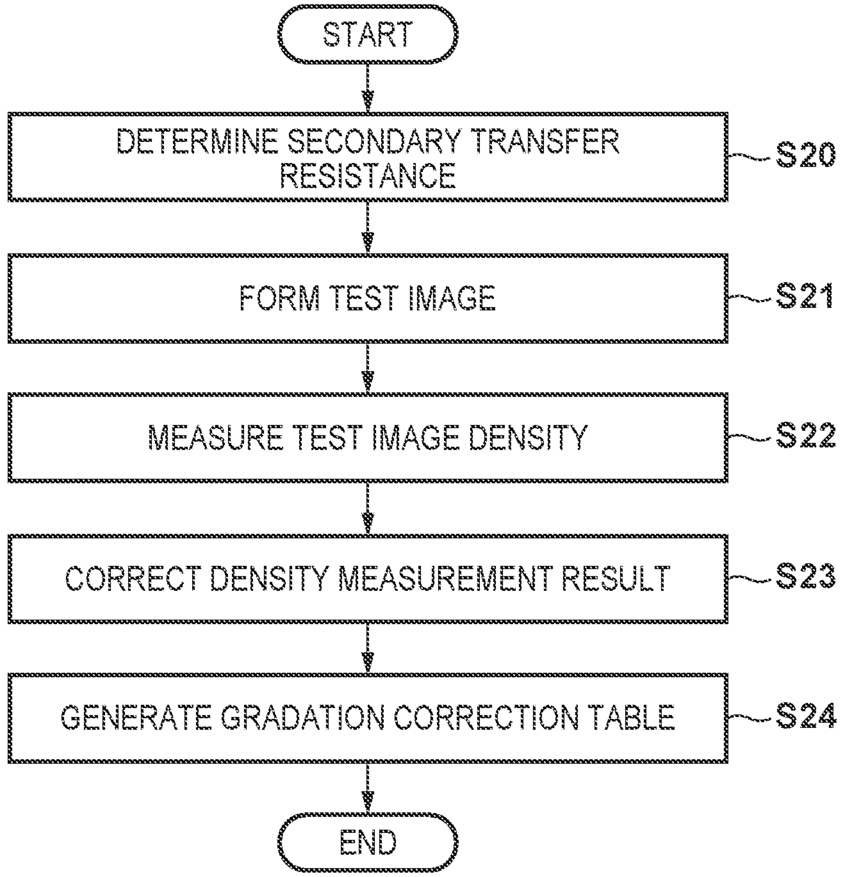
FIG. 11 is a flowchart of a density correction control according to an embodiment.

FIG. 11 is a flowchart of the density correction control according to the present embodiment. At S20, the control unit 25 determines the resistance value of the secondary transfer resistance. Specifically, the control unit 25 determines the target value of the secondary transfer current in the pre-rotation process, as has been described above. The control unit 25 then determines the voltage value of the secondary transfer voltage, in order to make the secondary transfer current match the target value. Therefore, the control unit 25 can determine the resistance value of the secondary transfer resistance by dividing the determined voltage value by the determined target value or the current value of the secondary transfer current detected by the current detection circuit 32.

Subsequently, at S21, the control unit 25 forms a test image for density measurement on the intermediate transfer belt 8. The test image includes a plurality of patch images of different densities. At S22, the control unit 25 measures the density of each patch image of the test image using the density sensor 27. At S23, the control unit 25 corrects, based on the resistance value of the secondary transfer resistance measured at S20, the density measured at S22 for each patch image. At S24, the control unit 25 generates the gradation correction table based on the corrected measured density of each patch image and stores the generated table in the memory 28.

Figure 12:
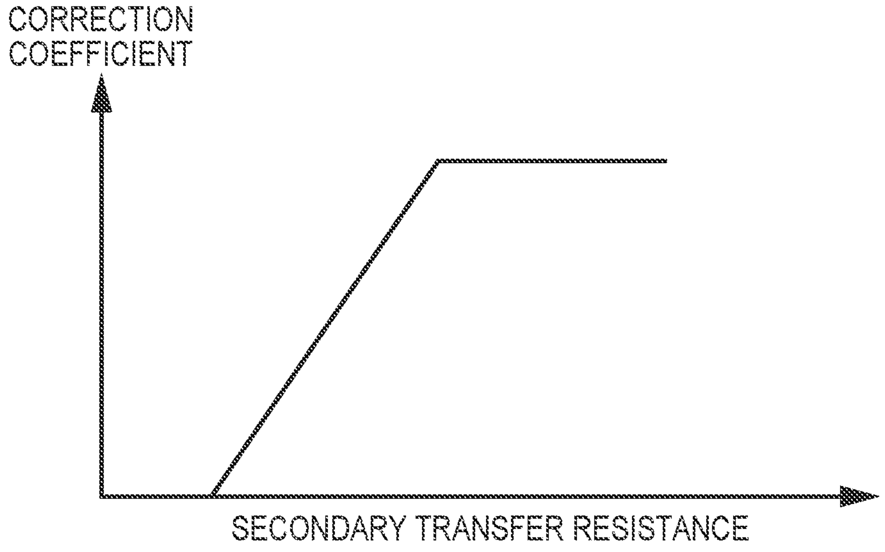
FIG. 12 illustrates second correction information according to an embodiment.

The concept of the method of correcting the measured density at S23 is similar to that of the first embodiment. However, as illustrated in FIG. 12, the correction coefficient information indicates a correspondence relation between the determined resistance value of the secondary transfer resistance and the correction coefficient.

As such, the present embodiment defines the evaluation value of the secondary transfer resistance in the first embodiment to be the resistance value of the secondary transfer resistance. Therefore, it is possible to generate a gradation correction table while taking into account the effect of secondary transfer, without performing secondary transfer from the intermediate transfer member, similarly to the first embodiment. In addition, the present embodiment uses the resistance value itself of the secondary transfer resistance as the evaluation value of the secondary transfer resistance, which can also be applied when the secondary transfer resistance increases and decreases along with the use of the image forming apparatus 100.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-112326, filed Jul. 6, 2021, which is hereby incorporated by reference herein in its entirety.

What is claimed is:

1. An image forming apparatus, comprising:
- an image former configured to form an image on an intermediate transfer belt based on image data;
- a secondary transfer roller configured to output a transfer voltage in order to cause a transfer current to flow so as to transfer the image formed on the intermediate transfer belt to a sheet;
- a sensor configured to measure a density of the image formed on the intermediate transfer belt; and
- a controller configured to:
  - control the image former to form a test image on the intermediate transfer belt based on test image data;
  - control the sensor to acquire a measured density of the test image;
  - correct the measured density of the test image based on an evaluation value of an electric resistance of a path through which the transfer current flows; and
  - generate data for density correction based on the test image data and a corrected measured density of the test image, wherein
- the controller includes at least one memory and the at least one memory stores first correction information indicating a correspondence relation between the measured density and a reference correction amount, and is further configured to:
- determine the reference correction amount corresponding to the measured density of the test image based on the first correction information;
  - determine a correction amount of the measured density of the test image by multiplying the determined reference correction amount by a correction coefficient corresponding to the evaluation value; and
  - correct the measured density of the test image based on the determined correction amount,
- wherein the evaluation value is an accumulated value of time during which the secondary transfer roller has outputted the transfer voltage, and,
- in the correspondence relation indicated by the first correction information, the reference correction amount becomes largest when the measured density takes a first value which is different from both a minimum value and a maximum value of the measured density.

2. The image forming apparatus according to claim 1, wherein the corrected measured density of the test image increases relative to the measured density of the test image.

3. The image forming apparatus according to claim 2, wherein the higher the evaluation value, the larger a difference between the corrected measured density of the test image and the measured density of the test image becomes.

4. The image forming apparatus according to claim 1, wherein the at least one memory stores second correction information indicating a correspondence relation between the evaluation value and the correction coefficient.

5. The image forming apparatus according to claim 1, wherein, in the correspondence relation indicated by the first correction information, the reference correction amount increases along with an increase of the measured density when the measured density lies within a range from the minimum value to the first value, and the reference correction amount decreases along with an increase of the measured density when the measured density lies within a range from the first value to the maximum value.

6. The image forming apparatus according to claim 1, wherein the controller is further configured to control a voltage value of the transfer voltage output by the secondary transfer roller so that a current value of the transfer current matches a target value.

7. The image forming apparatus according to claim 6, further comprising an environment sensor configured to measure at least one of temperature and humidity, wherein
- the controller is further configured to set the target value based on a result of measurement performed by the environment sensor.

8. The image forming apparatus according to claim 1, wherein the data for the density correction is a gradation correction table for converting pixel values indicated by the image data.

9. An image forming apparatus, comprising:
- an image former configured to form an image on an intermediate transfer belt based on image data;
- a secondary transfer roller configured to output a transfer voltage in order to cause a transfer current to flow so as to transfer the image formed on the intermediate transfer belt to a sheet;
- a sensor configured to measure a density of the image formed on the intermediate transfer belt; and
- a controller configured to:
  - control the image former to form a test image on the intermediate transfer belt based on test image data;
  - control the sensor to acquire a measured density of the test image;
  - correct the measured density of the test image based on an evaluation value of an electric resistance of a path through which the transfer current flows; and
  - generate data for density correction based on the test image data and a corrected measured density of the test image, wherein
- the controller includes at least one memory and the at least one memory stores first correction information indicating a correspondence relation between the measured density and a reference correction amount, and is further configured to:
  - determine the reference correction amount corresponding to the measured density of the test image based on the first correction information;
  - determine a correction amount of the measured density of the test image by multiplying the determined reference correction amount by a correction coefficient corresponding to the evaluation value; and correct the measured density of the test image based on the determined correction amount, wherein the evaluation value is an accumulated number of sheets on which image forming has been performed, and in the correspondence relation indicated by the first correction information, the reference correction amount becomes largest when the measured density takes a first value which is different from both a minimum value and a maximum value of the measured density.

10. The image forming apparatus according to claim 9, wherein the corrected measured density of the test image increases relative to the measured density of the test image.

11. The image forming apparatus according to claim 9, wherein the higher the evaluation value, the larger a difference between the corrected measured density of the test image and the measured density of the test image becomes.

12. The image forming apparatus according to claim 9, wherein the at least one memory stores second correction information indicating a correspondence relation between the evaluation value and the correction coefficient.

13. The image forming apparatus according to claim 9, wherein, in the correspondence relation indicated by the first correction information, the reference correction amount increases along with an increase of the measured density when the measured density lies within a range from the minimum value to the first value, and the reference correction amount decreases along with an increase of the measured density when the measured density lies within a range from the first value to the maximum value.

14. The image forming apparatus according to claim 9, wherein the controller is further configured to control a voltage value of the transfer voltage output by the secondary transfer roller so that a current value of the transfer current matches a target value.

15. The image forming apparatus according to claim 14, further comprising an environment sensor configured to measure at least one of temperature and humidity, wherein the controller is further configured to set the target value based on a result of measurement performed by the environment sensor.

16. The image forming apparatus according to claim 9, wherein the data for the density correction is a gradation correction table for converting pixel values indicated by the image data.

* * * * *